US011350241B2

(12) United States Patent
Wirola et al.

(10) Patent No.: US 11,350,241 B2
(45) Date of Patent: *May 31, 2022

(54) CONDITION BASED ACCURATE INDOOR POSITIONING

(71) Applicant: HERE Global B.V., Eindhoven (NL)

(72) Inventors: Lauri Aarne Johannes Wirola, Tampere (FI); Jari Tapani Syrjarinne, Tampere (FI); Pavel Ivanov, Tampere (FI); Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,568

(22) Filed: Apr. 15, 2020

(65) Prior Publication Data

US 2020/0245099 A1    Jul. 30, 2020

Related U.S. Application Data

(63) Continuation of application No. 15/483,077, filed on Apr. 10, 2017, now Pat. No. 10,659,923.

(51) Int. Cl.
*H04W 24/00* (2009.01)
*H04W 4/02* (2018.01)
*G01C 21/20* (2006.01)
*G01C 21/16* (2006.01)

(52) U.S. Cl.
CPC ............ *H04W 4/026* (2013.01); *G01C 21/16* (2013.01); *G01C 21/206* (2013.01); *H04M 2250/12* (2013.01)

(58) Field of Classification Search
CPC ..... H04W 4/026; G01C 21/206; G01C 21/16; H04M 2250/12
USPC ...................................................... 455/456.1
See application file for complete search history.

(56) References Cited

U.S. PATENT DOCUMENTS

| 9,052,202 | B2 | 6/2015 | Riley |
| 9,803,982 | B2 | 10/2017 | Han et al. |
| 2010/0079508 | A1 | 4/2010 | Hodge et al. |
| 2012/0290257 | A1 | 11/2012 | Hodge et al. |
| 2013/0130725 | A1* | 5/2013 | Forutanpour ......... G06F 1/1684 455/456.6 |
| 2014/0094200 | A1 | 4/2014 | Schatzberg et al. |

(Continued)

FOREIGN PATENT DOCUMENTS

WO    WO2014134804 A1    9/2014

OTHER PUBLICATIONS

Alex T. Mariakakis, "DirectMe: A Mobile Phone Algorithm for Direction Detection", pp. 1-13, Duke University, ECE/CS 2013.

(Continued)

*Primary Examiner* — Huy C Ho
(74) *Attorney, Agent, or Firm* — Lempia Summerfield Katz LLC

(57) ABSTRACT

A method is disclosed including determining an indicator information indicative of one or more indicators of a current usage of an electronic device, determining a condition information indicative of if the electronic device is rigidly positioned with respect to a user, wherein the condition information is determined based, at least in part, on the determined indicator information. It is further disclosed an according apparatus, computer program and system.

20 Claims, 6 Drawing Sheets

(56) References Cited

U.S. PATENT DOCUMENTS

| | | |
|---|---|---|
| 2014/0257766 A1 | 9/2014 | Poduri et al. |
| 2015/0281910 A1 | 10/2015 | Choudhury et al. |
| 2015/0354951 A1 | 12/2015 | Ali et al. |
| 2016/0066150 A1* | 3/2016 | Chao ............... H04W 4/025 |
| | | 455/456.1 |
| 2017/0105098 A1 | 4/2017 | Cordova et al. |
| 2018/0051989 A1 | 2/2018 | Lemarchand |
| 2018/0058855 A1 | 3/2018 | Han et al. |

OTHER PUBLICATIONS

Arvind Thiagarajan, "Probabilistic Models For Mobile Phone Trajectory Estimation", pp. 1-161, Department of Electrical Engineering and Computer Science, Sep. 2, 2011.

European Search Report and Written Opinion for corresponding Application No. 18163537.6-1003, dated Sep. 12, 2018.

European Search Report for European Patent Application No. 18163537.6-1003 dated Feb. 27, 2019.

European Office Action from European Patent Application No. 18163537.6, dated Mar. 25, 2022, 9 pages.

Tian, et al., "A Multi-Mode Dead Reckoning System for Pedestrian Tracking Using Smartphones", IEEE Sensors Journal, Apr. 1, 2016, 15 pages, vol. 16, No. 7.

\* cited by examiner

CONDITION BASED ACCURATE INDOOR POSITIONING

CROSS-REFERENCE TO OTHER APPLICATIONS

This application is a continuation under 35 U.S.C. § 120 and 37 C.F.R. § 1.53(b) of U.S. patent application Ser. No. 15/483,077 filed Apr. 10, 2017, which is hereby incorporated by reference in its entirety.

FIELD

The following disclosure relates to the field of indoor positioning, or more particularly relates to systems, apparatuses, and methods for determining a condition information indicative of an electronic device is rigidly positioned with respect to a user.

BACKGROUND

Indoor positioning (i.e. position finding, including floor detection) requires novel systems and solutions that are specifically developed and deployed for this purpose. The 'traditional' positioning technologies, which are mainly used outdoors, e.g. satellite and cellular positioning technologies, generally cannot deliver such performance indoors that would enable seamless and equal navigation experience in both environments. The required positioning accuracy (e.g. 2-3 m), coverage (e.g. ~100%) and floor detection are challenging to achieve indoors with satisfactory performance levels with the systems and signals that were not designed and specified for the indoor use cases. Satellite-based radio navigation signals simply do not penetrate enough through the walls and roofs for adequate signal reception, and the cellular signals usually have too narrow bandwidth for accurate ranging by default.

Several indoor-dedicated solutions have been developed and commercially deployed during the past years, e.g. solutions based on pseudolites (GPS-like short range beacons), ultra-sound positioning, BTLE signals (e.g. High-Accuracy Indoor Positioning, HAIP) and WiFi-Fingerprinting. What is typical to these solutions is that they require either deployment of totally new infrastructure (beacons, tags to name but a few examples) or manual exhaustive radio surveying of the buildings including all the floors, spaces and rooms. This is rather expensive and will take a considerable amount of time to build the coverage to the commercially expected level, which in some cases narrowed the potential market segment only to very thin customer base, e.g. for health care or dedicated enterprise solutions. Further, the diversity of these technologies makes it difficult to build a globally scalable indoor positioning solution, and the integration and testing will become complex if a large number of technologies needs to be supported in the consumer devices, such as smartphones.

For an indoor positioning solution to be commercially successful, that is, being globally scalable, having low maintenance and deployment costs, and offering acceptable end-user experience, the solution should be based on existing infrastructure in the buildings and on existing capabilities in the consumer devices. This leads to the conclusion that the indoor positioning is advantageously based on WiFi- and/or Bluetooth (BT)-technologies that are already supported in every smartphone, tablet, laptop and even in the majority of the feature phones. It is, thus, required to find a solution that uses the WiFi- and BT-radio signals in such a way that makes it possible to achieve e.g. 2-3 m horizontal positioning accuracy, e.g. close to 100% floor detection with the ability to quickly build the global coverage for this approach.

SUMMARY

While radio-based positioning can provide baseline positioning, for achieving accurate indoor positioning, the radio-based positioning needs to be spiced with information from one or more sensors (e.g. an inertial sensor) of the electronic device. The reasons include:
  (i) stabilization of the static case (radio measurements are noisy and thus even when staying still, the radio-based position has jitter);
  (ii) stabilization of the traversed path (radio measurements are very noisy and thus when walking the pure radio-bases position has some jitter); and
  (iii) tracking of the position while in areas, where the radio coverage is poor or non-existing requires the usage of one or more sensors of the electronic device since they can provide the only available data for the indoor positioning.

However, there are problems related to the location estimation with one or more sensors in indoor positioning:

The problem of sensor-based solution is that it provides accurate (within 2 to 3 meters) relative positioning fixes during limited time (not more than 1 to 3 minutes). In other words, location estimate accuracy degrades rapidly after reliable absolute geolocation (e.g. from GNSS) becomes unavailable. This is mainly because of noise in information obtained e.g. by an accelerometer and drift obtained e.g. by a gyroscope. This makes the estimated path to drift away at an accelerating rate.

Misalignment is the major problem when using inertial sensors of electronic devices in indoor positioning. This is because an electronic device can be held freely. In particular, the possibility of three-degree-of-freedom rotation of electronic devices makes it challenging to determine whether or not the motion sensor frame is aligned with the user motion frame. Unless the measurements of the sensor is updated with absolute geolocation (e.g. from GNSS), the direction of the electronic device may differ from that of the walking. For example, if the user changes the orientation of the electronic device, e.g. from portrait mode to landscape mode while walking straight, the user trajectory estimated based on measurements from a gyroscope sensor may make a 90-degree turn even though the user walked in a straight line. It is especially challenging when the electronic device is located in a pocket or in a swinging motion in the user's hand.

Misorientation of the electronic device is another obstacle to be overcome. Even if for instance inertial sensors were perfect, they only provide relative information (e.g. relative position information). For instance, it may be possible to obtain a track, but the orientation in the global coordinate system may be unknown. Thus, a track may be obtained which looks exactly correct based on the information obtained by the sensor, but is rotated by a certain amount with respect to the building.

Further, the accuracy of GNSS-based location estimates may be poor and biased close to buildings, because of the signal blockage and reflections by the buildings. This may for instance cause misreferencing of a track monitored of a user, for instance the track having an incorrect starting point.

This means that everything else being perfect, the track would be translated to an incorrect location by the amount of the initial error.

Step detection, which is typically used to detect the amount of spatial movement may be easily used for detecting steps when the user holds the electronic device rigidly, but steps are very difficult to detect e.g. when the electronic device is in swinging motion in the user's hands.

It is thus, inter alia, an object of the disclosure to achieve accurate indoor positioning, in particular a usage of one or more sensors providing relative information in a reliable manner.

According to a first exemplary embodiment of the present disclosure, a method is disclosed, the method comprising:

determining an indicator information indicative of one or more indicators of a current usage of an electronic device;

determining a condition information indicative of if the electronic device is rigidly positioned with respect to a user, wherein the condition information is determined based, at least in part, on the determined indicator information.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a mobile terminal. For instance, the method may be performed and/or controlled by using at least one processor of the apparatus, e.g. a server or an electronic device.

The steps of the method may for instance be controlled and/or performed by an apparatus comprising at least one processor and at least one memory including computer program code, the at least one memory and the computer program code configured to, with the at least one processor, cause an apparatus to perform and/or control the method according to the first aspect of the present disclosure. The at least one processor and/or the at least one memory may for instance be part of an apparatus, e.g. the electronic device, or another apparatus, e.g. a server that is different from the electronic device.

According to a further exemplary aspect of the disclosure, a computer program is disclosed, the computer program when executed by a processor causing an apparatus, for instance a server, to perform and/or control the actions of the method according to the first exemplary embodiment.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the disclosure, an apparatus is disclosed, configured to perform and/or control or comprising respective means for performing and/or controlling the method according to the first exemplary embodiment.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a second exemplary aspect of the disclosure, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary embodiment.

The above-disclosed apparatus according to any aspect of the disclosure may be a module or a component for a device, for example a chip. Alternatively, the disclosed apparatus according to any aspect of the disclosure may be a device, for instance a server or server cloud. The disclosed apparatus according to any aspect of the disclosure may comprise only the disclosed components, for instance means, processor, memory, or may further comprise one or more additional components.

According to a third exemplary aspect of the disclosure, a system is disclosed, comprising:

a first apparatus, e.g. an electronic device, according to any aspect of the disclosure as disclosed above, and a second apparatus, e.g. a server, that is different from the first apparatus, wherein the first apparatus is configured to provide at least one of a determined condition information, e.g. to the second apparatus.

In the following, exemplary features and exemplary embodiments of all aspects of the present disclosure will be described in further detail.

The electronic device may for instance be an apparatus according to the second aspect of the present disclosure. The electronic device may for instance be a terminal, e.g. a smartphone, tablet, smartwatch to name but a few examples.

The electronic device may for instance be portable (e.g. weigh less than 5, 4, 3, 2, or 1 kg). The electronic device may for instance be at least temporarily (e.g. in removable form) installed in a vehicle. The vehicle may for instance be a car, a truck, a motorcycle, a bicycle, a boat or a plane, to name but a few examples. The electronic device may for instance comprise or be connectable a display for displaying a route that is guided/navigated to a user. The electronic device may for instance comprise or be connectable to means for outputting sound, e.g. in form of spoken commands or information. The electronic device may for instance comprise or be connectable to one or more sensor for determining the devices position, such as for instance a Global Navigation Satellite System (GNSS) receiver, e.g. in the form of a Global Positioning System (GPS) receiver. The electronic device may for instance comprise or be connectable to one or more sensors, e.g. in the form of an accelerometer and/or a gyroscope for obtaining information. Based on the obtained information, the at least one indicator information can be determined. The electronic device may for instance be suitable for outdoor and for indoor navigation respectively positioning or for indoor navigation respectively positioning.

The determined indicator information may for instance stem from an electronic device. The indicator information may for instance represent one or more indicators obtained (e.g. gathered) by the electronic device. The one or more indicators, e.g. in the form of information, may for instance be obtained by one or more sensors of the electronic device. For instance, such a sensor of the electronic device may for instance be configured to obtain (e.g. gather and/or measure) an (e.g. actual) movement of the electronic device through observing physical quantities. Such a sensor may for instance be an inertial sensor (e.g. an accelerometer) and/or a gyroscope sensor to name but a few examples. Alternatively, the indicator information is determined based, at least in part, on information obtained (e.g. gathered) by one or more sensors (e.g. an inertial sensor or a gyroscope) of the electronic device. The indicator information may for instance be determined based, at least in part, on certain one or more events of the electronic device, e.g. whether a backlight of a screen is turned on or not, and/or whether input is entered into the electronic device or not.

At least a part of the indicator information may for instance comprise at least one piece of information indicative of whether the electronic device is oriented in a portrait mode or in a landscape mode. To determine whether the electronic device is oriented in a portrait mode or in a landscape mode, information obtained (e.g. gathered or measured) by one or more sensors (e.g. an inertial sensor, accelerometer) of the electronic device may for instance be considered.

Additionally or alternatively, the indicator information may for instance stem from an entity that is different from the electronic device, e.g. a server or another electronic device (e.g. in the form of a sensor, e.g. an inertial sensor or a gyroscope, connectable with the electronic device).

Based, at least in part, on the indicator information the condition information is determined. The condition information is indicative of if the electronic device is rigidly positioned with respect to a user or not. For instance, the electronic device is rigidly positioned with respect to a user in case the electronic device is held in a hand of the user and additionally, a screen respectively display of the electronic device is facing the user. That the electronic device is rigidly positioned with respect to the user may for instance comprise the case that the electronic device is held in a hand of the user, but not that the electronic device is positioned (e.g. placed) in a pocket of the user (e.g. in a pocket of the pants of the user).

Example embodiments thus make it possible to accurately determine a condition information representing that an electronic device is rigidly positioned with respect to the user and the electronic device is facing the user (e.g. the screen of the electronic device is facing the user). In this way, an accurate assumption can be made whether the electronic device is being hold steadily in a hand of the user or not. Based on this assumption, e.g. step detection based on information obtained (e.g. gathered) by one or more sensors of the electronic device (e.g. an inertial sensor) is reliable. For instance, the electronic device is not being steadily hold in the hand of the user, in case the electronic device is in a swinging motion, e.g. the user is walking and holding the electronic device in his swinging hand.

The condition information may for instance be provided (e.g. outputted) or caused providing, e.g. to a server, to an electronic device or to another apparatus that transfers the condition information to the server. The condition information may for instance be used for indoor navigation respectively positioning processes, e.g. performed and/or controlled by a positioning library, e.g. of the electronic device.

According to an exemplary embodiment of all aspects, the method further comprises:
  determining a directional movement information indicative of a motion, wherein the directional movement information is determined based, at least in part, on the determined condition information.

The directional movement information may for instance be indicative of a direction of a motion of the user. The directional movement information may for instance represent a user movement vector. The user movement vector may for instance point into the direction of the movement respectively motion of the user. The directional movement information may for instance be determined (e.g. calculated) by considering whether the electronic device is oriented in a portrait mode or in a landscape mode. Determining whether the electronic device is oriented in a portrait mode or in a landscape mode may for instance be determined based on an indicator information. Alternatively or additionally, such whether the electronic device is oriented in a portrait mode or in a landscape mode may for instance be comprised by the condition information. The directional movement information may for instance be determined based, at least in part, on an orientation information, wherein the orientation information is indicative of whether the electronic device is oriented in a portrait mode or in a landscape mode with respect to the user.

The directional movement information may for instance be determined based, at least in part, on one or more assumption information indicative of whether the direction of user movement respectively motion is perpendicular to at least one gravity vector or not. One or more components of the at least one gravity vector may for instance be comprised by the condition information. Alternatively, the one or more components of at least one gravity vector may for instance be received (e.g. provided from another apparatus). The directional movement information may for instance be determined based, at least in part, on the received one or more components of the at least one gravity vector. Depending on whether the electronic device is oriented in a portrait mode or in a landscape mode, the direction of user movement (e.g. represented by the user movement vector) may for instance be aligned with positive or negative direction of either longitudinal or latitudinal axis of the electronic device. Such axes may for instance be defined based, at least in part, on the condition information. Additionally, further information, e.g. an orientation information (indicative of the electronic device is oriented in a portrait mode or in a landscape mode) may be considered for defining the axes of the electronic device. The directional movement information may for instance be determined based, at least in part, on an orientation information.

Example embodiments thus make it possible to accurately determine a directional movement information since at least one axis of the electronic device corresponds to a direction of the user movement.

Further, based, at least in part, on a determined directional movement information and an absolute orientation information, an absolute heading information may for instance be determined. The absolute heading information may for instance be indicative of the user's absolute heading. The absolute orientation information may for instance be indicative of magnetic field information, e.g. obtained (e.g. gathered or measured) by one or more sensors of the electronic device (e.g. a magnetometer or compass sensor).

According to an exemplary embodiment of all aspects, the indicator information is determined based, at least in part, on one or more of the following parameters:
  (i) backlight information indicative of a backlight status of the electronic device;
  (ii) a user input information indicative of whether input is entered into the electronic device;

(iii) user eye detection information indicative of whether the user's eyes are facing the electronic device;
(iv) steadiness information indicative of a gravity vector measurement of the electronic device;
(v) or a combination thereof.

The backlight information may for instance represent whether a screen respectively display of the electronic device is switched on, off or dimmed. In case the user input information represents that input is entered into the electronic device by the user, it can be accurately assumed that (i) the user holds the electronic device in his hand, and (ii) the screen of the electronic device is facing the user. In this case, the condition information is determined to represent the electronic device is rigidly positioned with respect to the user. In case either the backlight information represents that the screen of the electronic device is switched off, or the user input information represents that no input is entered into the electronic device, the condition information is determined to represent the electronic device is not rigidly positioned with respect to the user.

The user eye detection information is indicative of whether the user's eyes are facing the electronic device or not. For instance, in case the electronic device comprises a camera, e.g. front camera, information can be gathered by the front camera of the electronic device. The information gathered by the front camera may for instance be monitored and analyzed by an algorithm for detecting eyes, e.g. an image recognition algorithm, which can analyze the gathered information to detect in particular eyes contained in the gathered information. In case eyes can be detected, in particular for a predefined period of time, the condition information is determined to indicative of the electronic device is rigidly positioned with respect to the user, since it can be accurately assumed that (i) the device is held in a hand of the user, and (ii) the electronic device is facing the user.

Additionally, the user eye detection may for instance be indicative of whether the electronic device is oriented in a portrait mode or in a landscape mode. For instance, information gathered by the front camera of the electronic device may for instance be monitored and analyzed by an algorithm for detecting eyes, e.g. an image recognition algorithm, which can analyze the gathered information to detect in particular eyes contained in the gathered information. Based on the relative position of one eye to another eye, the orientation of the electronic device can be determined.

The steadiness information may for instance represent one or more components of at least one gravity vector. The gravity vector measurement may for instance obtain (e.g. gather) the one or more components of at least one gravity vector. For instance, the one or more components of at least one gravity vector may for instance be obtained (e.g. gathered) by one or more sensors (e.g. an accelerometer) of the electronic device. Thus, the steadiness information may for instance be obtained (e.g. gathered or measured) by one or more sensors (e.g. an accelerometer) of the electronic device. The steadiness information may for instance represent one or more steady components of at least one gravity vector. In case the steadiness information represents one or more steady components of at least one gravity vector, it can be accurately assumed that the electronic device is being held in a hand of the user. In addition with one or more of the other parameters (backlight information, user input information, user eye detection information, or a combination thereof), the indicator information may for instance be determined to represent the current usage of the electronic device, e.g. the user holds the electronic device in his hands, the user is facing a screen of the electronic device, or the electronic device is positioned in a pocket, or the electronic device is in a swinging motion in the hand of the user.

It should be noted that one or more parameters based on which, at least in part, the indicator information may for instance be determined, may for instance be obtained (e.g. gathered and/or measured) in parallel. Alternatively, one or more parameters comprised by the indicator information may for instance be obtained in serial.

According to an exemplary embodiment of all aspects, wherein the determining of the condition information comprises checking or causing checking if one or more obtained components of at least one gravity vector fall within a specific range of values over a certain period of time or exceed at least one limit of the specific range of values over the certain period of time.

The one or more components of the at least one gravity vector may for instance be obtained (e.g. gathered or measured) by one or more sensors (e.g. an accelerometer) of the electronic device. The one or more components may for instance be obtained over a certain period of time. For instance, the certain period of time may for instance be a predefined time interval. The specific range of values and/or the at least one limit of the specific range of values may for instance be predetermined. The specific range of values and/or the at least one limit of the specific range of values may for instance be set to indicate whether the electronic device is in a steady position with respect to the user or not. The at least one limit of the specific range may for instance be the lower limit of the specific range. Alternatively or additionally, the at least one limit of the specific range may for instance be the upper limit of the specific range. Thus, in case the condition information is determined based, at least in part, on one or more obtained components of at least one gravity vector of the steadiness information, based on which, at least in part, the indication information is determined, the condition information can represent whether the electronic device is rigidly positioned with respect to the user or not.

Additionally, the specific range of values and/or the at least one limit of the specific range of values may for instance be set to be indicative of the electronic device is positioned in a pocket of the user, or be indicative of the electronic device is not positioned rigidly with respect to the user, e.g. in a swinging motion in a hand of the user. Further scenarios with respect to the position of a current usage of the electronic device may for instance be set based on a corresponding definition of the specific range of values and/or the certain threshold. For instance, if the one or more obtained components of at least one gravity vector vary over the certain period of time (e.g. exceeding at least one limit of the specific range of values over the certain period of time, e.g. at least once), it may for instance be determined that the electronic device (which has for instance obtained the one or more components of the at least one gravity vector) is e.g. in swinging motion or rotating. In case the one or more obtained components of at least one gravity vector are for instance substantially steady over the certain period of time (e.g. not exceeding at least one limit of the specific range of values over the certain period of time, or falling within the specific range of values over the certain period of time, to name but a few non-limiting examples), it may for instance be determined that the electronic device is rigidly positioned with respect to the user, e.g. the orientation of the electronic device is fixed. This case may for instance represent that the steadiness information represents one or more steady components of at least one gravity vector.

The specific range of values and/or the at least one limit of the specific range of values may for instance be set to represent a relatively narrow range compared to a broader range so that the determined indication information representing whether the electronic device is rigidly positioned with respect to the user or not is more sensitive to changes of the one or more components of the at least one gravity vector. In case the specific range of values and/or the at least one limit of the specific range of values may for instance be set to represent a relatively broader range compared to a narrow range so that the determined indication information representing whether the electronic device is rigidly positioned with respect to the user or not is more robust to changes of the one or more components of the at least one gravity vector.

In this way, a rate-of-change of the one or more components of the at least one gravity vector over the certain period of time can be used to determine whether the electronic device is rigidly positioned with respect to the user or not.

According to an exemplary embodiment of all aspects, the method further comprises:
checking or causing checking whether the condition information represents the electronic device is rigidly positioned with respect to the user;
providing or causing providing a relative information of the electronic device dependent upon the result of the checking or causing checking, wherein the relative information of the electronic device is at least in part indicative of one or more pieces of information obtained from at least one sensor of the electronic device For instance, in case the checked or caused checking condition information represents the electronic device is rigidly positioned with respect to the user, a relative information, e.g. obtained (e.g. gathered) from one or more sensors of the electronic device (e.g. an inertial sensor) may for instance be provided (e.g. outputted). Additionally, the relative information may for instance be used in determining location estimates of the electronic device, e.g. by an indoor positioning process. In case the checked or caused checking condition information represents the electronic device is not rigidly positioned with respect to the user, the relative information may for instance not be provided since e.g. heading change may not be computable and step detection may not work reliable.

The relative information may for instance be one or more pieces of relative position information. For instance, the one or more pieces of relative position information may for instance represent information obtained (e.g. gathered) by an inertial sensor (e.g. an accelerometer and/or gyroscope) of an electronic device.

According to an exemplary embodiment of all aspects, the method further comprises:
determining an orientation information, wherein the orientation information is indicative of the electronic device is oriented in a portrait mode or in a landscape mode with respect to the user.

For instance, the orientation information may be determined based, at least in part, on a user eye detection information of an indicator information, as described above. Further, the orientation information may be determined based, at least in part, on a steadiness information obtained (e.g. gathered or measured) by one or more sensors (e.g. an inertial sensor, accelerometer) of the electronic device. Subsequently, the condition information may for instance be determined based, at least in part, on the determined orientation information. Additionally or alternatively, the directional movement information may for instance be determined based, at least in part, on the determined orientation information.

According to an exemplary embodiment of all aspects, the method further comprises:
defining or causing defining one or more vectors and one or more axes based, at least in part, on the determined orientation information,
wherein the directional movement information is determined based, at least in part, on the defined one or more vectors and the defined one or more axes.

The one or more vectors and one or more axes may for instance be part of a coordinate system used for determining the directional movement information. The coordinate system may for instance be defined with respect to the electronic device. Thus, based on the defined one or more vectors and one or more axes, directional movement information with respect to the electronic device may for instance be determined (e.g. calculated).

In an exemplary embodiment according to all aspects, the method further comprises:
determining an orientation change information indicative of a change of the orientation of the electronic device.

The orientation change information may for instance represent that the orientation of the electronic device has changed from portrait mode to landscape mode and vice versa. For instance, the orientation of the electronic device may be monitored (e.g. continuously, or in intervals of a predefined duration). In case, the orientation of the electronic device changes from portrait mode to landscape mode, it may be necessary to define the one or more vectors and the one or more axes with respect to the electronic device accordingly.

According to an exemplary embodiment of all aspects the orientation information is determined based, at least in part, on the determined orientation change information. Thus, the orientation information may for instance be dependent upon the current orientation of the electronic device.

According to an exemplary embodiment of all aspects the directional movement information is determined based on the subsequent formula:

$$V = aY' + bX'.$$

Based, at least in part, on the condition information, the directional movement information, which may for instance represent the direction of user motion based on the one or more assumptions that the direction of user movement is perpendicular to at least one gravity vector, can be determined. The directional movement information may for instance represent that the direction of user motion, e.g. in the form of a vector of user movement, is based on the one or more assumptions that the direction of user movement is aligned with positive or negative direction of either longitudinal or latitudinal axis of the electronic device. This may for instance be dependent on whether the electronic device is in a portrait or landscape mode, e.g. represented by an orientation information. A vector of user movement, which may for instance represent the direction of user movement, may for instance be perpendicular to at least one gravity vector. Additionally, the vector of user movement may for instance be aligned with the linear combination of projections of Y and X axes onto a horizontal plane (e.g. of a coordinate system defined with respect to the electronic device). The horizontal plane may for instance be defined by the at least one gravity vector (and not the planes of the screen of the electronic device).

In the formula, V is the vector of user motion, Y' and X' are projections of Y and X axes onto horizontal plane, a and b are coefficients proportional to Y and X components of the gravity vector.

Moreover, since based on the condition information representing that the electronic device is rigidly positioned with respect to the user (e.g. user holds electronic device in hand), the screen of the electronic device faces towards the user, signs of a, b can be computed, and they are opposite to the signs of the Y and X components of the gravity vector. For example, when Y component of the gravity vector is negative, vector of user motion is perpendicular to one or more gravity vectors and aligned with the positive projection of Y axis onto horizontal plane. For instance, vector of user motion is a linear combination of Y' and X' projections with coefficients 1 and 0 respectively.

Alternatively, in case the electronic device is oriented in a landscape mode (e.g. represented by a corresponding orientation information), the vector of user motion may for instance be a linear combination of Y' and X' projections with coefficients 0 and 1 respectively. It is also possible that the electronic device is in such position that the at least one gravity vector is almost aligned with either Y or X axis. In that case, the vector of user motion, e.g. represented by a directional movement information, may for instance be aligned with the negative direction of Z axis.

In an exemplary embodiment according to all aspects of the present disclosure, the method further comprises:
providing or causing providing the determined condition information for an indoor navigation process.

According to an exemplary embodiment of all aspects, the method further comprises:
using the provided or caused providing condition information for an indoor navigation process.

In an exemplary embodiment according to all aspects the track of the user is continuously determined with or without a sensor of the electronic device, dependent upon the determined condition information.

The track may for instance be steadily tracked. Additionally or alternatively, the track may for instance be continuously tracked in intervals, e.g. time intervals of equal duration.

The sensor of the electronic device may for instance be an inertial sensor (e.g. accelerometer) or a gyroscope of the electronic device.

It is to be understood that the presentation of the disclosure in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
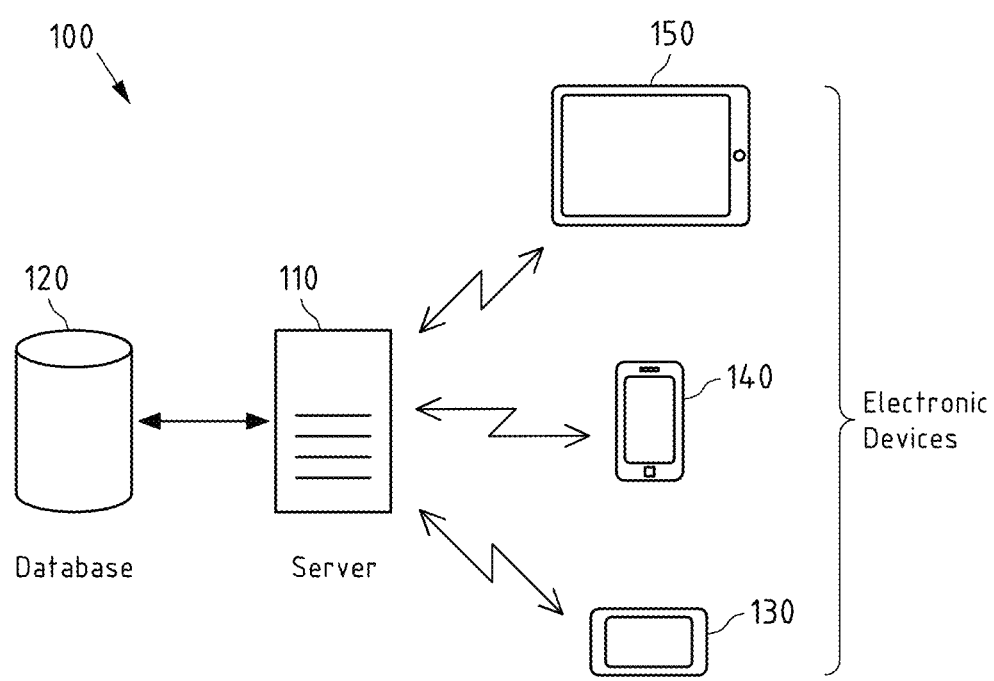
FIG. 1 a schematic block diagram of a system according to an exemplary aspect of the present disclosure.

FIG. 1 is a schematic block diagram of a system according to an exemplary aspect of the present disclosure. System 100 comprises a server 110, which may alternatively be embodied as a server cloud (e.g. a plurality of servers connected e.g. via the internet and providing services at least partially jointly), a database 120, which may be connected to the server, e.g. via the internet and allowing access from the server 110 to data of the database 120. Alternatively the database 120 may be embodied e.g. in the server 120. System 100 comprises an electronic device, of which three different realizations are shown as non-limiting examples: a portable navigation device 130, a mobile device (e.g. terminal) 140 and a tablet 150.

According to an example embodiment, electronic device 130, 140 and 150 may for instance store navigation data, e.g. provided by server 110. Communication, e.g. for the transmission of the navigation data, between server 110 and electronic device 130, 140, 150 may for instance take place at least partially in a wireless function, e.g. based on cellular radio communication or on Wireless Local Area Network (WLAN) based communication, to name but a few non-limiting examples. Navigation data may for instance be used for indoor navigation respectively positioning processes.

The electronic device 130, 140, 150 may for instance be configured to provide a condition information for an indoor navigation respectively positioning process. Alternatively, the electronic device 130, 140, 150 may be configured to perform and/or control the indoor navigation respectively positioning process. The indoor navigation respectively positioning process may for instance use e.g. a provided condition information. For instance, based whether the provided condition information represents that an electronic device, e.g. electronic device 130, 140, 150 is rigidly positioned with respect to a user, the indoor navigation respectively positioning process may be configured to perform e.g. a localization based on obtained (e.g. gathered) information from one or more sensors (e.g. an inertial sensor) of the electronic device. Otherwise, e.g. the localization may not be based on obtained (e.g. gathered) information from one or more sensors (e.g. the inertial sensor) of the electronic device and may only be based e.g. on absolute localization of e.g. a GNSS-based localization.

Figure 2:
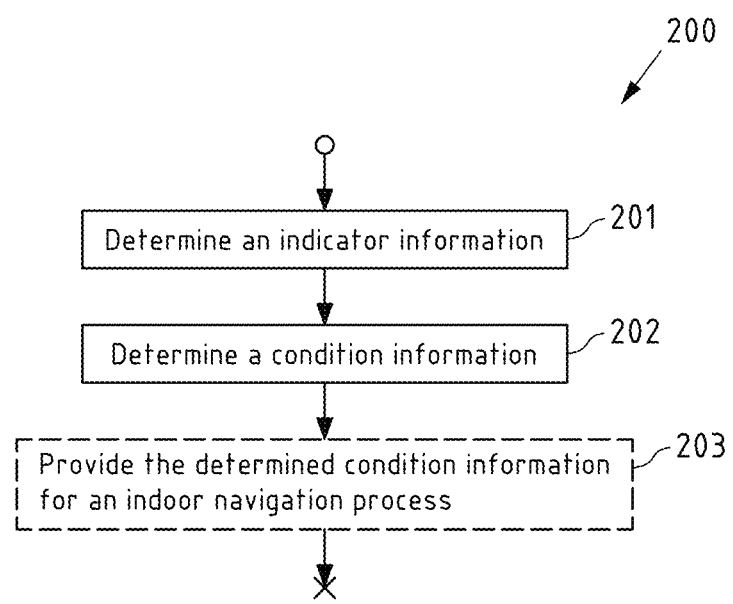
FIG. 2 a flowchart showing an example embodiment of a method according to the first aspect of the present disclosure.

FIG. 2 is a flowchart 200 showing an example embodiment of a method according to the first aspect of the present disclosure. This flowchart 200 may for instance be performed by a server, e.g. server 110 of FIG. 1, or by an electronic device, e.g. electronic device 130, 140, 150 of FIG. 1.

In step 201, an indicator information is determined. The indicator information is for instance obtained (e.g. received) from an electronic device, or from another entity. Alternatively, the indicator information is determined, e.g. by a server or an electronic device, based, at least in part, on one or more parameters, e.g. (i) a backlight information; (ii) a user input information; (iii) a user eye detection information; (iv) a steadiness information; (v) or a combination thereof. The one or more parameters may for instance be obtained (e.g. gathered), e.g. by one or more sensors, in particular one or more sensors of an electronic device. The one or more sensor may for instance be one or more inertial sensors, e.g. one sensor may be an accelerometer and/or another sensor may be a gyroscope. The one or more sensors may for instance be used to obtain the one or more parameters, based on which, at least partly, the indicator information is determined, e.g. by at least one processor of a server, or of an electronic device.

In step 202, a condition information is determined. The condition information is determined, at least in part, based on the indicator information. For instance, in a first case the determined indicator information represents that the electronic device is held in a hand of a user and additionally a screen of the electronic device is facing the user. Thus, the condition information is determined accordingly. Further, in a second case the determined indicator information represents that the electronic device is not held in a hand of the user, e.g. the electronic device is in a pocket. The condition information is determined accordingly. In the first case, the determined condition information represents that the electronic device is rigidly positioned with respect to the user. In the second case, the determined condition information represents that the electronic device is not rigidly positioned with respect to the user.

In an optional step 203, the determined condition information is provided for e.g. using it in an indoor navigation process. For instance, the determined condition information is provided to e.g. a positioning library, which may for instance be configured to be used by an electronic device for an indoor navigation process. Based on the provided condition information, the positioning library can decide whether to obtain information from one or more sensors, e.g. an inertial sensor, of the electronic device and using these information for localization or not. In this way, based on the condition information certain assumptions about alignment between the user and the electronic device take place, and therefore one or more sensors (e.g. one or more inertial sensor) of the electronic device can be used in a reliable manner (only if the usage of the one or more sensors results in a higher positioning accuracy). Thus, localization accuracy greatly improves.

Figure 3:
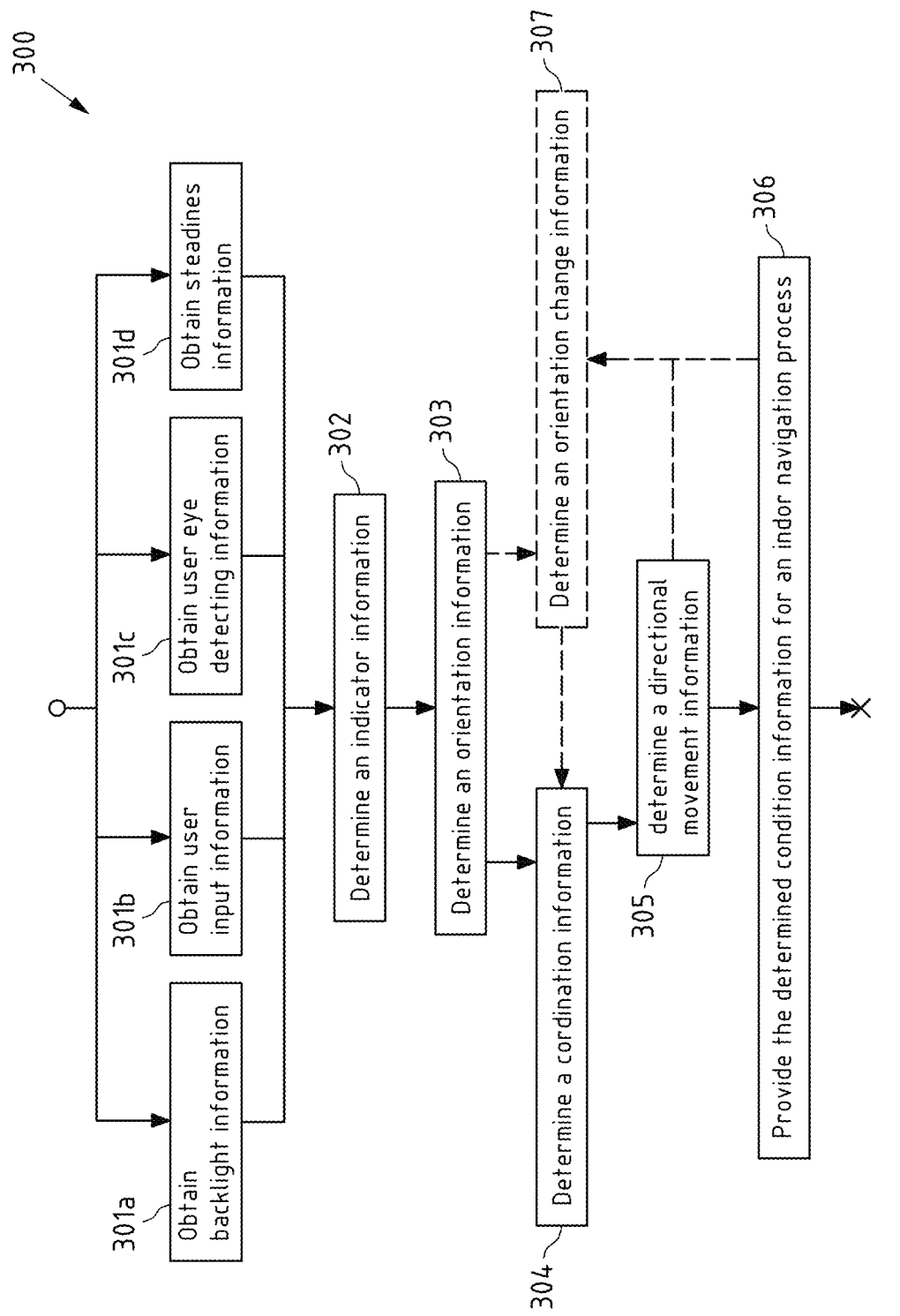
FIG. 3 a flowchart showing an example embodiment of a method according to the first aspect of the present disclosure.

FIG. 3 is a flowchart 300 showing an example embodiment of a method according to the first aspect of the present disclosure. This flowchart 300 may for instance be performed by a server, e.g. server 110 of FIG. 1, or by an electronic device, e.g. electronic device 130, 140, 150 of FIG. 1.

In steps 301a to 301d, (i) backlight information, (ii) user input information, (iii) user eye information, (iv) steadiness information, or (v) a combination thereof are obtained (e.g. gathered). One or more of these parameters may for instance be obtained by one or more sensors of the electronic device. Additionally or alternatively, one or more of these parameters may for instance be obtained based on certain events. For instance, a user input information may be obtained by monitoring whether input is entered into the electronic device or not.

Steps 301a to 301d may for instance take place in serial or in parallel. Alternatively, for instance in case backlight information is obtained in step 301a, step 301b is performed subsequently. Additionally or alternatively, each of the steps 301a to 301d may for instance be performed, at least partly, continuously so that the condition information can be updated, e.g. in real-time.

In case the user input information represents that input is entered into the electronic device by the user, it can be accurately assumed that (i) the user holds the electronic device in his hand, and (ii) the screen of the electronic device is facing the user. Further, in case the backlight information represents that the backlight of a screen of the electronic device is turned on, it can be accurately assumed that (i) the user holds the electronic device in his hand, and (ii) the screen of the electronic device is facing the user, and (iii) the user is steadily holding the electronic device in his hand.

One or more of the parameters obtained in step 301a to 301d are used in step 302 to determine an indicator information. The indicator information is indicative of a current usage of the electronic device. At hand, the current usage of the electronic device is represented by the obtained one or more parameters of steps 301a to 301d ((i) backlight information, (ii) user input information, (iii) user eye information, (iv) steadiness information, or (v) a combination thereof).

In step 303, an orientation information is determined. The orientation information is indicative of the electronic device is oriented in a portrait mode or in a landscape mode. For instance, the orientation information can be determined based, at least in part, on the obtained steadiness information of step 301d. The steadiness information may for instance be obtained (e.g. gathered or measured) by one or more sensors (e.g. an inertial sensor, accelerometer) of the electronic device. The steadiness information may for instance represent one or more components of at least one gravity vector. Thus, the orientation of the electronic device can be determined, based, at least in part, on the steadiness information, in particular based on the one or more components of the at least one gravity vector of the steadiness information. Dependent upon the direction in which the one or more components of the at least one gravity vector is pointing, the orientation information can be determined to represent whether the electronic device is oriented in a portrait mode or in a landscape mode.

Additionally or alternatively, the orientation information can be determined based, at least in part, on obtained user eye information of step 301c. For instance, information gathered by the front camera of the electronic device may for instance be monitored and analyzed by an algorithm for detecting eyes, e.g. an image recognition algorithm, which can analyze the gathered information to detect in particular eyes contained in the gathered user eye information. Based on the relative position of one eye to another eye, the orientation of the electronic device can be determined.

A condition information is determined in step 304, based, at least in part, on the determined indicator information. Further, the condition information may be determined based, at least in part, on the determined orientation information. The condition information is indicative of the electronic device is rigidly positioned with respect to the user.

In step 305, a directional movement information is determined, based at least in part, on the condition information, in particular comprising the orientation information. The directional movement information may for instance be determined based, at least in part, on one or more assumption information indicative of whether the directional of user movement respectively motion is perpendicular to at least one gravity vector or not. One or more components of at least one gravity vector may for instance be comprised by the condition information. Additionally, the directional movement information may be determined based, at least in part, on the obtained steadiness information of step 301d.

In a step 306, the determined condition information is provided for e.g. using it in an indoor navigation process.

In optional step 307, an orientation change information is determined. The orientation change information is indicative of whether the orientation of the electronic device has changed e.g. from portrait mode to landscape mode or vice versa. Since the directional movement information is dependent on the orientation of the electronic device (represented by the orientation information), it is crucial to indicate whether or not the orientation of the electronic device has changed or not. For instance, the determining of the orientation change information may be performed continuously (e.g. in predefined time intervals, or after a first orientation information is determined, to name but a few non-limiting examples), e.g. for a real-time monitoring of the orientation of the electronic device. The stroked arrows pointing to step 307 indicate that step 307 may for instance be performed subsequent to each of the prior steps 303, 305, and/or 306. Further, optional step 307 can take place in parallel with one or more of the steps 303, 305, 306, or a combination thereof.

Even in case the condition information is provided for an indoor navigation process (see step 306), the orientation change information still may for instance be determined in step 307.

Since the condition information may change over a certain period, the exemplary flowchart may be viewed to be performed continuously and/or repeatedly. For instance, the parameters obtained by steps 301a to 301d may change, so that those one or more parameters may for instance be obtained continuously and/or repeatedly as well. For instance, every time one of the one or more parameters changes, the subsequent steps (in this case 302 to 307) may be performed. Thus, the exemplary flowchart 300 (the flowchart 200 of FIG. 2 as well) may be considered to be performed iteratively, e.g. to adapt the condition information to current conditions of the electronic device.

Figure 4:
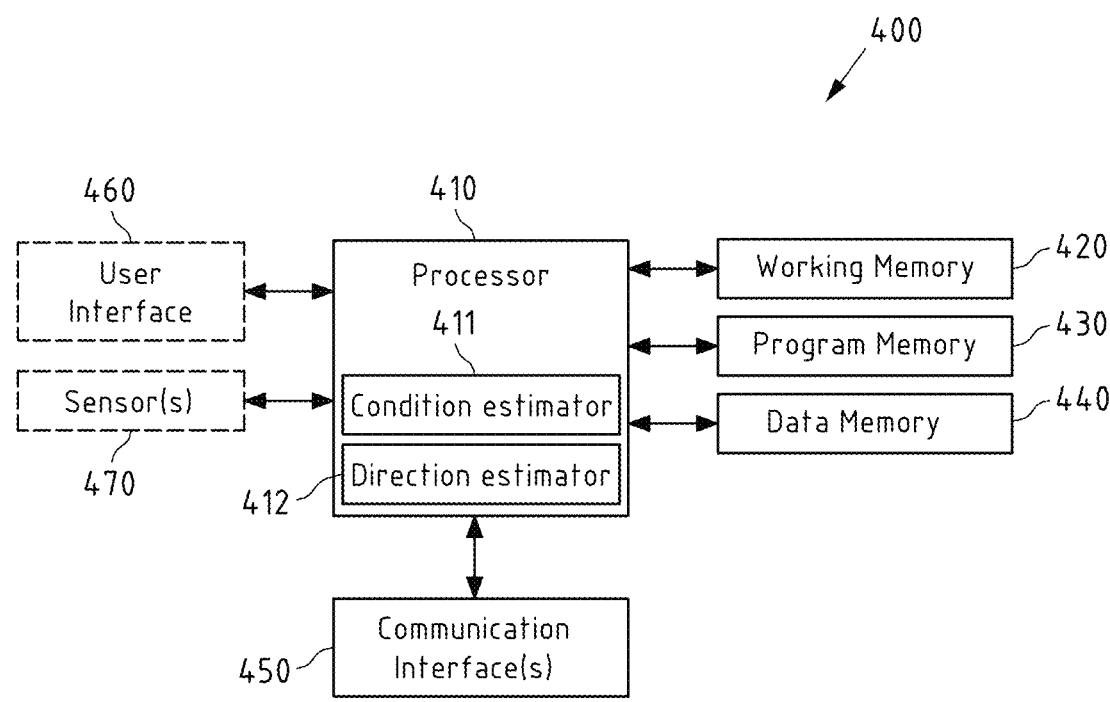
FIG. 4 a schematic block diagram of an apparatus according to an exemplary aspect of the present disclosure.

FIG. 4 is a schematic block diagram of an apparatus 400 according to an exemplary aspect of the present disclosure, which may for instance be performed and/or controlled by at least one electronic device 130, 140, and/or 150 of FIG. 1. Alternatively, the schematic block diagram of the apparatus 400 according to an exemplary aspect of the present disclosure may for instance be performed and/or controlled by server 110 of FIG. 1.

Apparatus 400 comprises a processor 410, working memory 420, program memory 430, data memory 440, communication interface(s) 450, an optional user interface 460 and optional sensor(s) 470.

Apparatus 400 may for instance be configured to perform and/or control or comprise respective means (at least one of 410 to 470) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to exemplary aspects of the disclosure.

Processor 410 may for instance comprise a condition estimator 411 and/or a direction estimator 412 as a functional and/or structural unit(s). Condition estimator 411 may for instance be configured to determine a condition information (see step 202 of FIG. 2). Direction estimator 412 may for instance be configured to determine a directional movement information (see step 305 of FIG. 3). Processor 410 may for instance further control the memories 420 to 440, the communication interface(s) 450, the optional user interface 460 and optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 450 enable apparatus 400 to communicate with other entities, e.g. with server 110 of FIG. 1 or with electronic device 130, 140, 150 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise one or more sensors, e.g. to obtain one or more parameters (see steps 301a to 301d of FIG. 3), e.g. an inertial sensor, accelerometer, gyroscope to name but a few examples, based on which an indicator information (see step 302 of FIG. 3) may be determined.

Some or all of the components of the apparatus 400 may for instance be connected via a bus. Some or all of the components of the apparatus 400 may for instance be combined into one or more modules.

The following exemplary embodiments shall also considered to be disclosed:

An inertial sensor of an electronic device can significantly improve the accuracy and the perceived quality of indoor positioning. The accuracy improve stems in particular from one or more sensors of the electronic device being able to obtain (e.g. gather or measure) the actual movement through observing physical quantities. Thus, the tracked movement of the electronic device is more stable than when just relying on radio measurements (e.g. Bluetooth and/or WiFi) for tracking the movement. Also, distances moved from one epoch to another can be more realistic making the visualized trajectory smooth improving the perceived quality.

Thus, there are good reasons to use the one or more sensors of an electronic device for indoor navigation respectively positioning processes. However, they suffer from multitude of problems as described above in the summary section of this specification. Misorientation and misreferencing are problems that can be alleviated by having another positioning technology, such as radio-based, to support positioning. Also drift, which is a result of noise and misalignment can be mitigated with other technologies, but not fully.

Misalignment is the hardest of the mentioned problems. To solve this problem, the three-degree-of-freedom rotation of the electronic device has to be compensated sufficiently. Therefore, it is needed to use one or more sensors of the electronic device in an intelligent way only when they are thought to work well.

In case the electronic device is for instance in a pocket, it suffices to locate the electronic device with somewhat lesser accuracy without the use of one or more sensors of the electronic device, since the one or more sensors of the electronic device are known not to perform well when the electronic device is located in a pocket. In this case, it can be relied only on radio-based positioning for locating the electronic device. This provides good enough location quality for e.g. indoor geofencing and proximity-type use cases.

Vice versa, higher accuracy and location stability may for instance be required, when a user actually looks at the screen of the electronic device. A clear indication of the user looking at the screen of the electronic device is for instance that the background light of the screen is switched on. In addition to screen backlight events (e.g. background light is turned on, off, or dimmed), user input (e.g. clicks, touches, or the like to name but a few examples) may for instance indicate that the user is keeping the electronic device in his hand. Thus, a movement to be tracked of the electronic device may for instance be performed by estimating the location estimates based, at least in part, on relative information, e.g. obtained by one or more sensors of the electronic device when an event indicates that the background light is on and the user interacts with the electronic device. In case both of these conditions are met, it may for instance be assumed that the electronic device is rigidly positioned with respect to the user. Thus, e.g. step detection is reliable when the electronic device is rigidly positioned with respect to the user. Further, axes of the electronic device corresponding to a direction of the user movement respectively a corresponding directional movement information may for instance be determined since it is perpendicular to a gravity vector and aligned with positive direction of one of the axes of the electronic device depending on the screen rotation mode (e.g. the electronic device is oriented in a portrait or in a landscape mode). One or more components of at least one gravity vector as well as screen rotation mode may for instance be easily determined based on acceleration measurements, e.g. obtained by one or more sensors of the electronic device. Moreover, by knowing the direction of the movement with respect to the axes of the electronic device, and using measurements from magnetometer, it is also possible to estimate user's absolute heading.

Another strong indication may for instance be an eye detection event. In some electronic devices a front camera may for instance be used to monitor via image recognition, if eyes can be detected. If so, background light is kept strong, otherwise it is dimmed. This kind of event is a strong indicator that it is safe to use one or more sensors of the electronic device, e.g. for indoor navigation respectively positioning processes. The reason is that the electronic device is surely held firmly in the hand of the user making e.g. step detection and direction detection reliable. Additionally, front camera images and computer vision algorithms can be used to detect landscape or portrait modes, which may for instance be difficult to determine in case when the surface of the screen is e.g. almost perpendicular to Earth's gravity.

A third indication that the electronic device is being held in hand may for instance be one or more steady components of at least one gravity vector, wherein the one or more components of the at least one gravity vector may for instance point at one or more certain directions specific to such a hand held user mode. Moreover, gravity vector may for instance be used for determining of the actual direction of the user motion, since the sole fact about the electronic device being held in e.g. a portrait or landscape orientation does not provide complete information about the direction of user motion.

Screen backlight and user interaction events as well as one or more components of at least one gravity vector (or raw acceleration) may for instance be obtained from the operating system of the electronic device. Eye detection events may for instance be detected based on raw imagery data from a front camera and computer vision algorithms.

Figure 5:
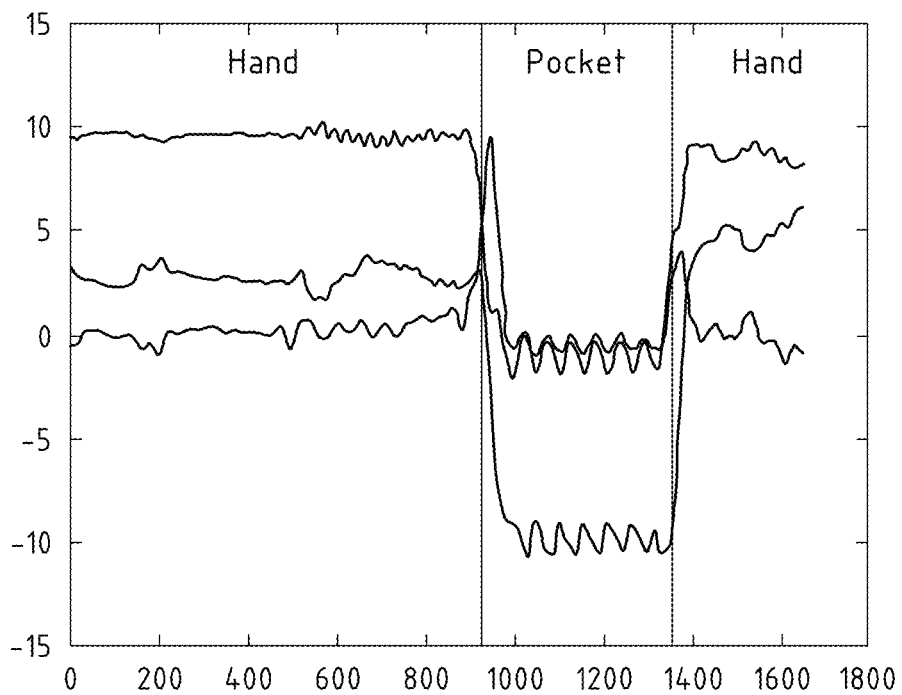
FIG. 5 a schematic diagram of plotted components of a gravity vector used in an exemplary embodiment of a method according to the first aspect of the present disclosure.

All mentioned events may for instance be communicated to e.g. a positioning library (e.g. via Android/iOS API) for indoor navigation respectively positioning processes, e.g. by providing a determined condition information. The provided condition information may for instance be processed, e.g. by the positioning library and represents either that the electronic device is rigidly positioned with respect to the user in a usual portrait or landscape mode, or otherwise that one or more sensors of the electronic device should not (respectively cannot) be used. Namely, backlight and user interaction events may for instance indicate that the user holds the electronic device in his hand, and most probably in a normal position in front his face. In addition to instantaneous backlight or user interaction events, the provided condition information may for instance be indicative of a direction of one or more components of at least one gravity vector, e.g. to verify that the electronic device is actually kept in front of the user. Additionally or alternatively, the one or more components of at least one gravity vector may for instance be monitored, e.g. continuously. Thus, it may for instance be checked when the position of the electronic device has been changed with respect to the user (e.g. the user body), e.g. moved from hand to pocket. To verify whether the electronic device is kept in front of the user, e.g. the positioning library, may for instance check whether one or more components of the gravity vector fall inside specific range of values over a certain period of time, which are representative of the electronic device being rigidly positioned with respect to the user. In order to monitor changes of the location of the electronic device with respect to the user (e.g. user body), gravity vector measurements may for instance be monitored constantly. In FIG. 5, a schematic diagram of plotted components of a gravity vector used in an exemplary embodiment of a method according to the first aspect of the present disclosure is shown. The components of the gravity vector are plotted over a certain period of time when an electronic device has been moved from hand to pocket and back to hand of the user. It can be seen that change of device location (e.g. hand of the user, pocket of the user to name but a few non-limiting examples) with respect to the user (e.g. body of the user) can be detected when e.g. norm between consecutive gravity vectors exceed certain limit of a specific range of values.

Indication of electronic device being held in front of a user is a valuable information on his own, since it allows for instance to rely on e.g. inertial sensors of the electronic device and compute change of user heading and detect user steps. In addition to that, it is also possible to compute direction of user motion with respect to electronic device axes, and further compute user absolute heading based e.g. on magnetometer measurements.

When e.g. the positioning library is provided with a condition information representing 'backlight of electronic device is on', and 'user enters input' (e.g. as an event), it is an indication that the electronic device is positioned rigidly with respect to the user (e.g. the electronic device is held in hand of the user and facing the user) in either portrait or landscape mode and one or more sensors of the electronic device may for instance be used with the corresponding one or more assumptions. For instance, the positioning library may continue to use the one or more sensors of the electronic device until a condition information, e.g. provided to the positioning library, represents that the electronic device has been moved from the hand of the user to another location as described above.

Figure 6:
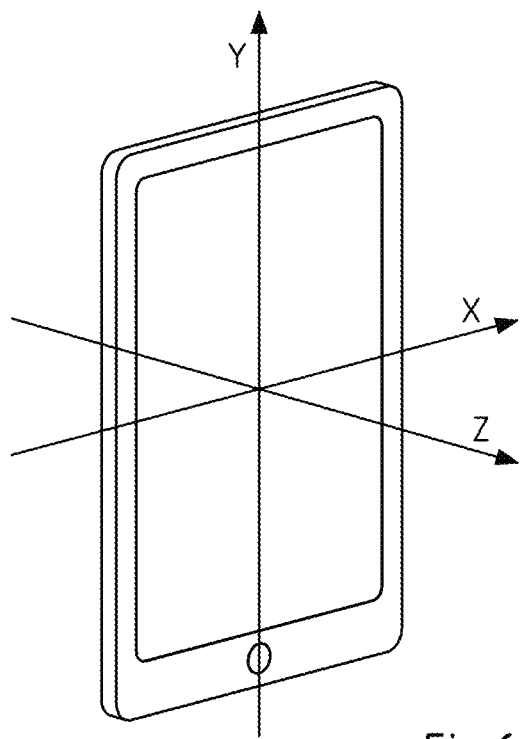
FIG. 6 a schematic diagram of defined axes with respect to an electronic device used in an exemplary embodiment of a method according to the first aspect of the present disclosure.

Based, at least in part, on the condition information, e.g. the positioning library may for instance determine a directional movement information, which may for instance represent the direction of user motion based on the one or more assumptions that it is perpendicular to gravity vector and 'aligned' with positive or negative direction of either longitudinal or latitudinal axis of the electronic device (e.g. Y and X axes of FIG. 6), depending on the electronic device is in a portrait or landscape mode, e.g. represented by a determined orientation information. Strictly speaking, vector of user motion is perpendicular to gravity vector and aligned with the linear combination of projections of Y and X axes onto horizontal plane which is defined by the gravity vector (not the planes of the screen of the electronic device):

$$V = aY' + bX',$$

where V is the vector of user motion, Y' and X' are projections of Y and X axes onto horizontal plane, a and b are coefficients proportional to Y and X components of gravity vector.

Figure 7:
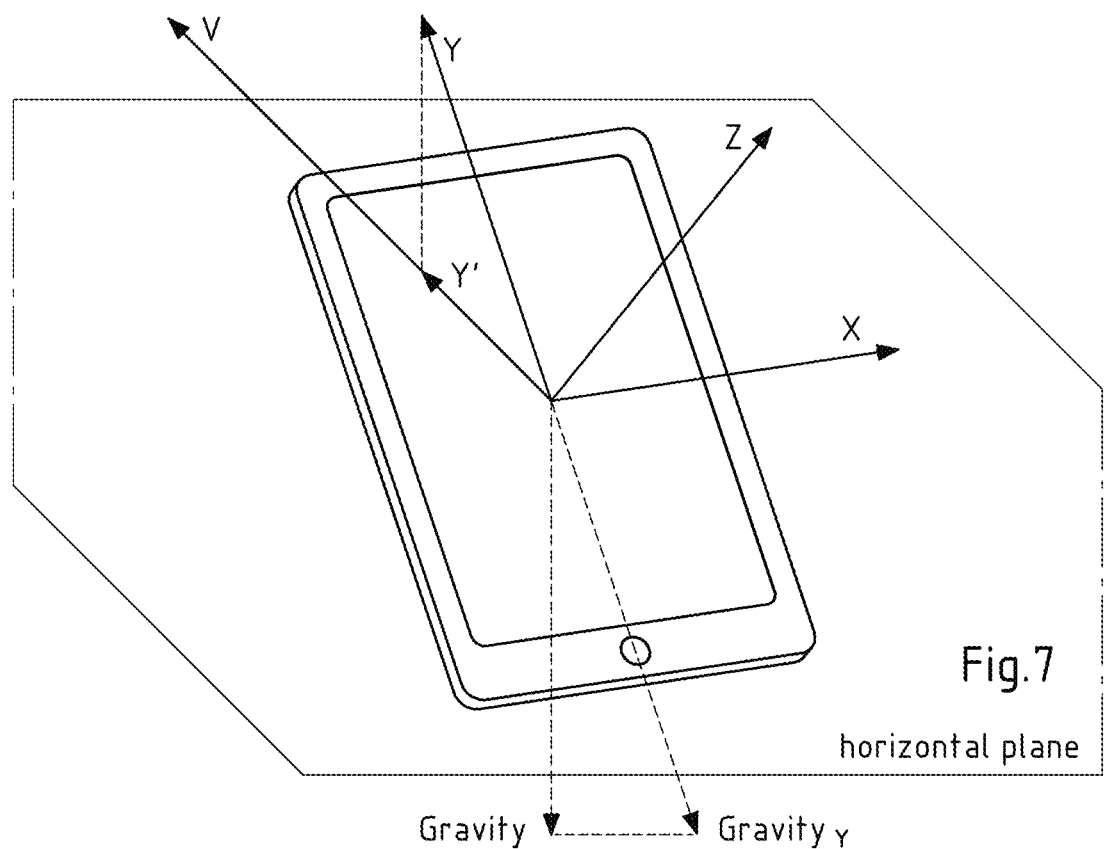
FIG. 7 a schematic diagram of defined axes, components of a gravity vector and a user motion vector with respect to an electronic device oriented in a portrait mode used in an exemplary embodiment of a method according to the first aspect of the present disclosure.

Moreover, since based on the condition information representing that the electronic device is rigidly positioned with respect to the user (e.g. user holds electronic device in hand), the screen of the electronic device faces towards the user, signs of a, b can be computed, they are opposite to the signs of the Y and X components of the gravity vector. For example, when Y component of the gravity vector is negative, as shown in FIG. 7, vector of user motion is perpendicular to gravity vector and aligned with the positive projection of Y axis onto horizontal plane. For instance, vector of user motion is a linear combination of Y' and X' projections with coefficients 1 and 0 respectively.

Figure 8:
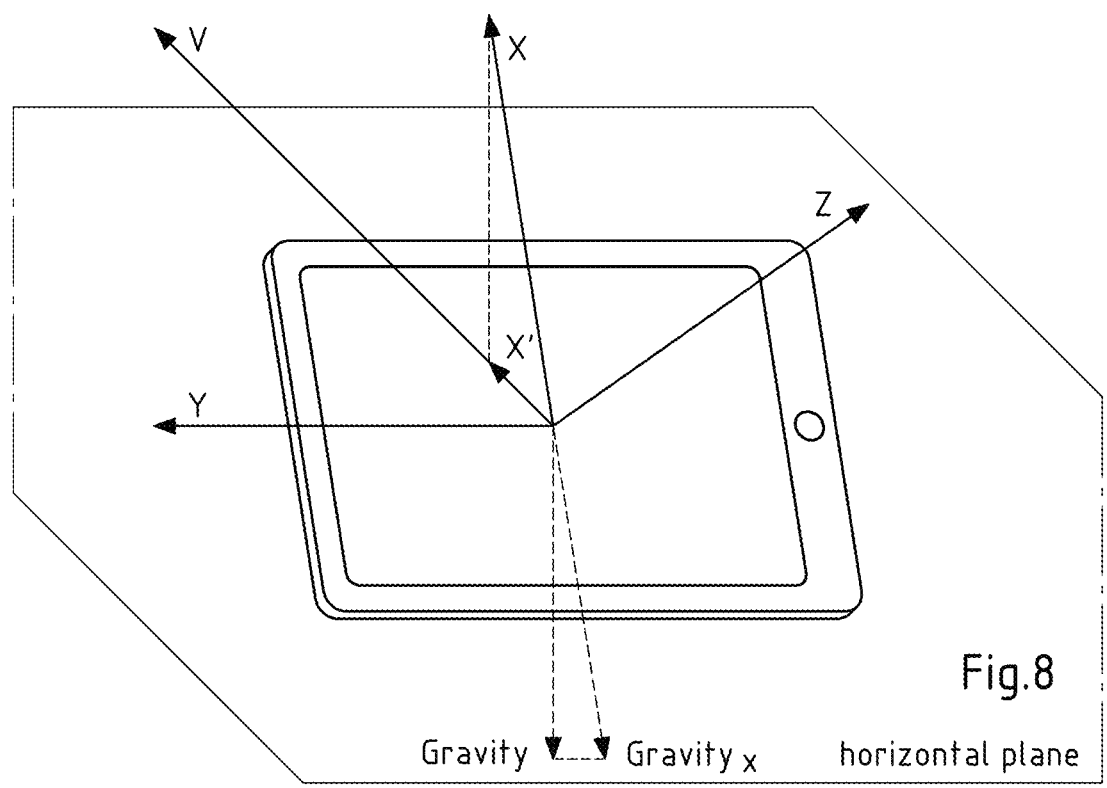
FIG. 8 a schematic diagram of defined axes, components of a gravity vector and a user motion vector with respect to an electronic device oriented in a landscape mode used in an exemplary embodiment of a method according to the first aspect of the present disclosure.

Alternative case is present when the electronic device is oriented in a landscape mode, which is presented in FIG. 8. In FIG. 8, the vector of user motion is a linear combination of Y' and X' projections with coefficients 0 and 1 respectively. It is also possible that the electronic device is in a such position that gravity vector is almost aligned with either Y or X axis, in that case the vector of user motion, e.g. represented by a directional movement information, is aligned with the negative direction of Z axis, again because of the assumption that the screen of the electronic device is oriented towards the user and in the opposite direction of user motion.

When e.g. a positioning library detects, based on a provided condition information, that an electronic device is in hand in front of a user and does not change abruptly, it can track user motion using one or more sensors of the electronic device, e.g. an inertial sensor of the electronic device. Heading change of the user motion can be computed and steps can be detected reliably. Additionally, since it is known from the condition information that the user interacts with the electronic device (e.g. user enters input e.g. via touchpad on the screen of the electronic device), the screen is oriented towards the user, vector of user motion and hence absolute user heading can be computed, which is extremely valuable information in indoor navigation respectively positioning processes. Moreover, in case the condition information represents that the electronic device is rigidly positioned with respect to the user, such modes/regimes represent most important use cases, when very good localization accuracy is expected, for instance when the user is constantly tracking his position on the screen.

All in all, information about user interaction with the electronic device allows to make certain assumptions about alignment between the user and the electronic device, and therefore use one or more sensors (e.g. one or more inertial sensor) of the electronic device in a reliable manner, and greatly improve localization accuracy.

In this way, a conservative use of one or more sensors of an electronic device, for instance detecting when one or more conditions are present such that the one or more sensors are known to behave well. In general, those one or more conditions match well with the need to have location estimates based, at least in part, on relative information, e.

g. obtained by one or more sensors of the electronic device (e.g. so-called sensor-boosted) for indoor navigation processes.

The following embodiments shall also be considered to be disclosed:

Embodiment 1

A method, comprising:
determining an indicator information indicative of one or more indicators of a current usage of an electronic device;
determining a condition information indicative of if the electronic device is rigidly positioned with respect to a user, wherein the condition information is determined based, at least in part, on the determined indicator information.

Embodiment 2

The method according to embodiment 1, the method further comprising:
determining a directional movement information indicative of a direction of a motion, wherein the directional movement information is determined based, at least in part, on the determined condition information.

Embodiment 3

The method according embodiment 1 or embodiment 2, wherein the indicator information is determined based, at least in part, on one or more of the following parameters:
(i) backlight information indicative of a backlight status of the electronic device;
(ii) a user input information indicative of whether input is entered into the electronic device;
(iii) user eye detection information indicative of whether the user's eyes are facing the electronic device;
(iv) steadiness information indicative of a gravity vector measurement of the electronic device;
(v) or a combination thereof.

Embodiment 4

The method according to any of the embodiments 1 to 3, wherein the determining of the steadiness information comprises checking or causing checking if one or more obtained components of at least one gravity vector fall within a specific range of values over a certain period of time or exceed at least one limit of the specific range of values over the certain period of time.

Embodiment 5

The method according to any of the embodiments 1 to 4, the method further comprising:
checking or causing checking whether the condition information represents the electronic device is rigidly positioned with respect to the user;
providing or causing providing a relative information of the electronic device dependent upon the result of the checking or causing checking, wherein the relative information of the electronic device is at least in part indicative of one or more pieces of information obtained from at least one sensor of the electronic device.

Embodiment 6

The method according to any of the embodiments 1 to 5, the method further comprising:
determining an orientation information, wherein the orientation information is indicative of the electronic device is oriented in a portrait mode or in a landscape mode with respect to the user.

Embodiment 7

The method according to embodiment 6, the method further comprising:
defining or causing defining one or more vectors and one or more axes based, at least in part, on the determined orientation information, wherein the directional movement information is determined based, at least in part, on the defined one or more vectors and the defined one or more axes.

Embodiment 8

The method according to any of the embodiments 1 to 7, the method further comprising:
determining an orientation change information indicative of a change of the orientation of the electronic device.

Embodiment 9

The method according to any of the embodiments 6 to 8, wherein the orientation information is determined based, at least in part, on the determined orientation change information.

Embodiment 10

The method any of the embodiments 2 to 9, wherein the directional movement information is determined based on the subsequent formula:

$$V = aY' + bX'.$$

Embodiment 11

The method any of the embodiments 1 to 10, the method further comprising:
providing or causing providing the determined condition information for an indoor navigation process.

Embodiment 12

The method any of the embodiments 1 to 11, the method further comprising:
using the provided or caused providing condition information for an indoor navigation process.

Embodiment 13

The method any of the embodiments 1 to 12, wherein the track of the user is continuously determined with or without a sensor of the electronic device, dependent upon the determined condition information.

Embodiment 14

An apparatus comprising at least one processor and at least one memory including computer program code; the at least one memory and the computer program code configured to, with the at least one processor, cause the apparatus to at least perform:
  determining an indicator information indicative of one or more indicators of a current usage of an electronic device;
  determining a condition information indicative of if the electronic device is rigidly positioned with respect to a user, wherein the condition information is determined based, at least in part, on the determined indicator information.

Embodiment 15

The apparatus according to embodiment 14, the at least one memory and the computer program code configured to, with the at least one processor, cause the apparatus to at least further perform:
  determining a directional movement information indicative of a direction of a motion, wherein the directional movement information is determined based, at least in part, on the determined condition information.

Embodiment 16

The apparatus according to embodiment 14 or embodiment 15, wherein the indicator information is determined based, at least in part, on one or more of the following parameters:
  (i) backlight information indicative of a backlight status of the electronic device;
  (ii) a user input information indicative of whether input is entered into the electronic device;
  (iii) user eye detection information indicative of whether the user's eyes are facing the electronic device;
  (iv) steadiness information indicative of a gravity vector measurement of the electronic device;
  (v) or a combination thereof.

Embodiment 17

The apparatus according to any of the embodiments 14 to 16, wherein the determining of the steadiness information comprises checking or causing checking if one or more obtained components of at least one gravity vector fall within a specific range of values over a certain period of time or exceed at least one limit of the specific range of values over the certain period of time.

Embodiment 18

The apparatus according to any of the embodiments 14 to 17, the at least one memory and the computer program code configured to, with the at least one processor, cause the apparatus to at least further perform:
  checking or causing checking whether the condition information represents the electronic device is rigidly positioned with respect to the user;
  providing or causing providing a relative information of the electronic device dependent upon the result of the checking or causing checking, wherein the relative information of the electronic device is at least in part indicative of one or more pieces of information obtained from at least one sensor of the electronic device.

Embodiment 19

The apparatus according to any of the embodiments 14 to 18, the at least one memory and the computer program code configured to, with the at least one processor, cause the apparatus to at least further perform:
  determining an orientation information, wherein the orientation information is indicative of the electronic device is oriented in a portrait mode or in a landscape mode with respect to the user.

Embodiment 20

The apparatus according to embodiment 19, the at least one memory and the computer program code configured to, with the at least one processor, cause the apparatus to at least further perform:
  defining or causing defining one or more vectors and one or more axes based, at least in part, on the determined orientation information,
  wherein the directional movement information is determined based, at least in part, on the defined one or more vectors and the defined one or more axes.

Embodiment 21

The apparatus according to any of the embodiments 14 to 20, the at least one memory and the computer program code configured to, with the at least one processor, cause the apparatus to at least further perform:
  determining an orientation change information indicative of a change of the orientation of the electronic device.

Embodiment 22

The apparatus according to any of the embodiments 19 to 21, wherein the orientation information is determined based, at least in part, on the determined orientation change information.

Embodiment 23

The apparatus according to any of the embodiments 15 to 22, wherein the directional movement information is determined based on the subsequent formula:

$$V = aY' + bX'.$$

Embodiment 24

The apparatus according to any of the embodiments 14 to 23, the at least one memory and the computer program code configured to, with the at least one processor, cause the apparatus to at least further perform:
  providing or causing providing the determined condition information for an indoor navigation process.

Embodiment 25

The apparatus according to embodiment 24, the at least one memory and the computer program code configured to, with the at least one processor, cause the apparatus to at least further perform:
  using the provided or caused providing condition information for an indoor navigation process.

Embodiment 26

The apparatus according to any of the embodiments 14 to 25, wherein the track of the user is continuously determined with or without a sensor of the electronic device, dependent upon the determined condition information.

Embodiment 27

An apparatus configured to perform and/or control or comprising respective means for performing and/or controlling the method of any of the embodiments 1 to 13.

Embodiment 28

An apparatus comprising at least one processor and at least one memory including computer program code, the at least one memory and the computer program code configured to, with the at least one processor, cause an apparatus at least to perform and/or control the method of any of the embodiments 1 to 13

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on his own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the disclosure and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, the at least one memory and the computer program code configured to, with the at least one processor, cause the apparatus to at least perform:
   receiving sensor data collected at an electronic device, wherein the sensor data is indicative of a gravity vector measured by the electronic device;
   determining an alignment of a component of the gravity vector with at least a portion of a user movement vector;
   determining, based on the alignment of the gravity vector with the portion of the user movement vector, whether the sensor data indicates that the electronic device is substantially rigidly positioned relative to an entity associated with the electronic device;
   selecting a first localization technique for the electronic device that includes use of at least one inertial sensor when the electronic device is rigidly positioned with respect to the entity; and
   selecting a second localization technique for the electronic device that excludes use of inertial sensors when the electronic device is not rigidly positioned with respect to the entity.

2. The apparatus of claim 1, wherein the second localization technique for the electronic device includes data associated with a global navigation satellite system.

3. The apparatus of claim 1, wherein the at least one inertial sensor include an accelerometer, a gyroscope, or both.

4. The apparatus of claim 1, the at least one memory and the computer program code configured to, with the at least one processor, cause the apparatus to at least further perform:
   determining a direction of motion of the electronic device based, at least in part, on the sensor data.

5. The apparatus of claim 1, the at least one memory and the computer program code configured to, with the at least one processor, cause the apparatus to at least further perform:
   determining an orientation of the electronic device based, at least in part, on the sensor data.

6. The apparatus of claim 5, the at least one memory and the computer program code configured to, with the at least one processor, cause the apparatus to at least further perform:
   defining one or more vectors and one or more axes based, at least in part, on the determined orientation; and
   determining directional movement of the electronic device based, at least in part, on the one or more vectors and the one or more axes.

7. The apparatus of claim 1, wherein the first localization technique is associated with a higher accuracy than the second localization technique.

8. The apparatus of claim 1, wherein the entity associated with the user is a body of a user.

9. The apparatus of claim 1, wherein the sensor data includes steadiness information for the electronic device.

10. A method comprising:
   receiving sensor data collected at an electronic device, wherein the sensor data is indicative of a gravity vector measured by the electronic device;
   determining an alignment of a component of the gravity vector with at least a portion of a user movement vector;
   determining, based on the alignment of the gravity vector with the portion of the user movement vector, whether the sensor data indicates that the electronic device is substantially rigidly positioned relative to user of the electronic device;
   selecting a first localization technique for the electronic device that includes use of at least one inertial sensor when the electronic device is rigidly positioned with respect to the user; and
   selecting a second localization technique for the electronic device that excludes use of inertial sensors when the electronic device is not rigidly positioned with respect to the user.

11. The method of claim 10, wherein the second localization technique for the electronic device includes data associated with a global navigation satellite system.

12. The method of claim 10, wherein the at least one inertial sensor include an accelerometer, a gyroscope, or both.

13. The method of claim 10, further comprising:
   determining a direction of motion of the electronic device based, at least in part, on the sensor data.

14. The method of claim 10, further comprising:
   determining an orientation of the electronic device based, at least in part, on the sensor data;
   defining one or more vectors and one or more axes based, at least in part, on the determined orientation; and
   determining directional movement of the electronic device based, at least in part, on the one or more vectors and the one or more axes.

15. The method of claim 10, wherein the first localization technique is associated with a higher accuracy for indoor positioning than the second localization technique.

16. The method of claim 10, wherein the sensor data includes steadiness information for the electronic device.

17. A non-transitory computer-readable medium storing computer program code, the computer program code when executed by a processor causing an apparatus to perform:
   receiving sensor data collected at an electronic device, wherein the sensor data is indicative of a gravity vector measured by the electronic device;
   determining an alignment of a component of the gravity vector with at least a portion of a user movement vector;
   determining, based on the alignment of the gravity vector with the portion of the user movement vector, whether the sensor data indicates that the electronic device is substantially rigidly positioned relative to the user of the electronic device;
   selecting a first localization technique for the electronic device that includes use of at least one inertial sensor when the electronic device is rigidly positioned with respect to the user; and
   selecting a second localization technique for the electronic device that excludes use of inertial sensors when the electronic device is not rigidly positioned with respect to the user.

18. The non-transitory computer-readable medium of claim 17, wherein the second localization technique for the electronic device includes data associated with a global navigation satellite system.

19. The non-transitory computer-readable medium of claim 17, wherein the at least one inertial sensor include an accelerometer, a gyroscope, or both.

20. The non-transitory computer-readable medium of claim 17, wherein the first localization technique is associated with a higher accuracy for indoor positioning than the second localization technique.

* * * * *